Feb. 8, 1966 L. L. LEINONEN 3,234,024
PHOTOGRAPHIC FILM ROLL AND METHODS AND APPARATUS
FOR MANUFACTURING SAME
Filed Jan. 25, 1963 3 Sheets-Sheet 1
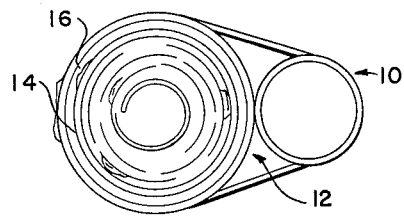
FIG. 1.
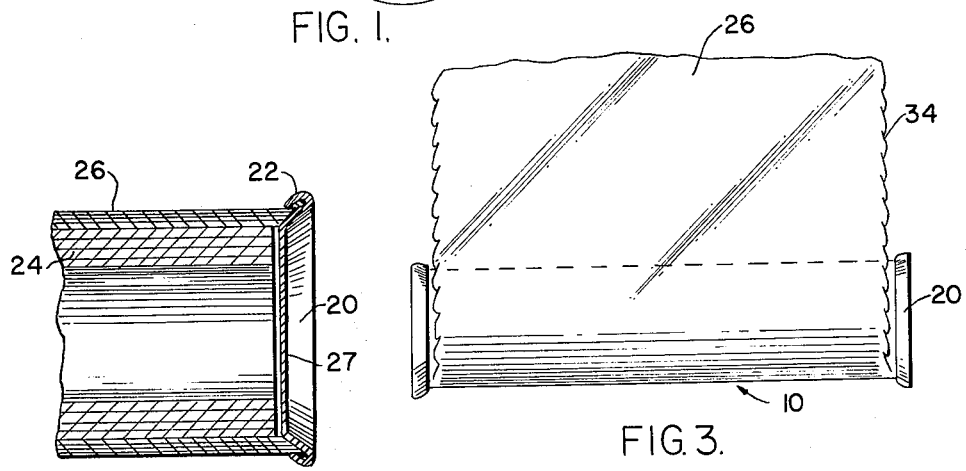
FIG. 2
FIG. 3.
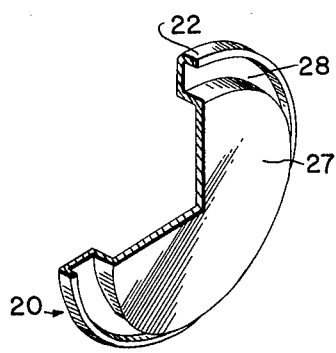
FIG. 5.
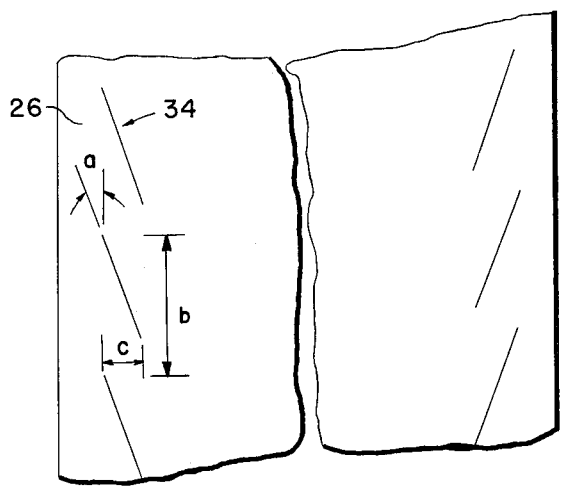
FIG. 4.
INVENTOR.
Leonard L. Leinonen
BY Brown and Mikulka
and
Stanley H. Mervis
Attorneys

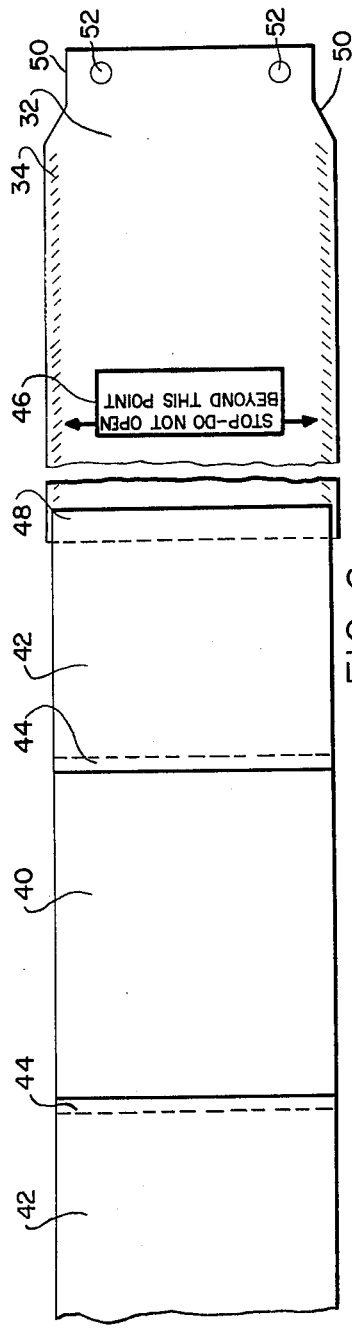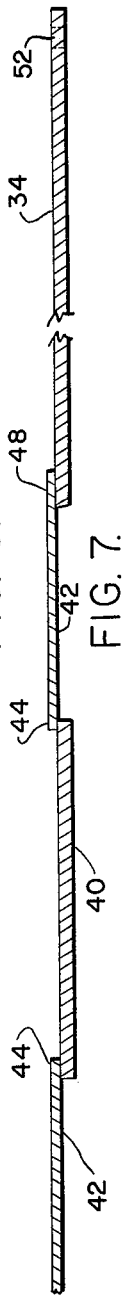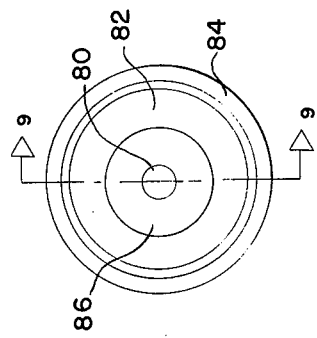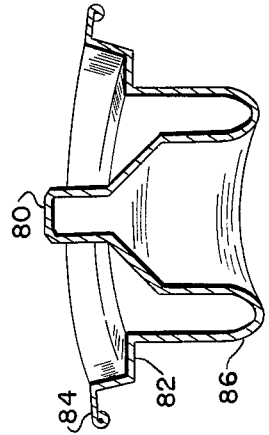

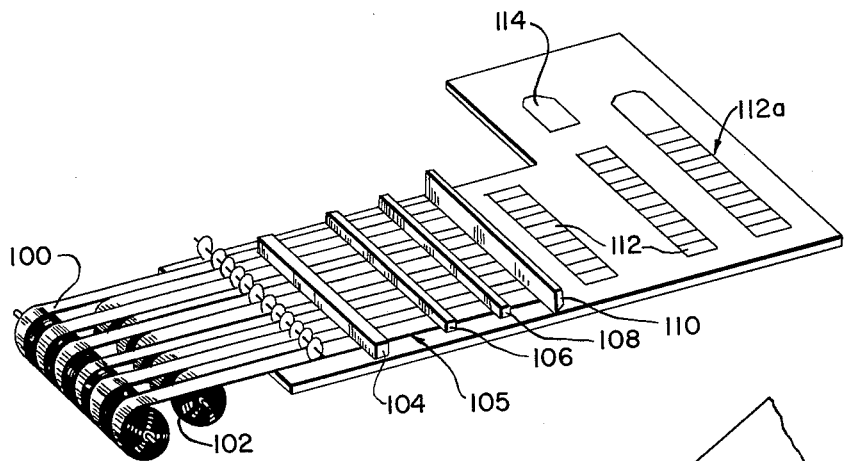
FIG. 10.
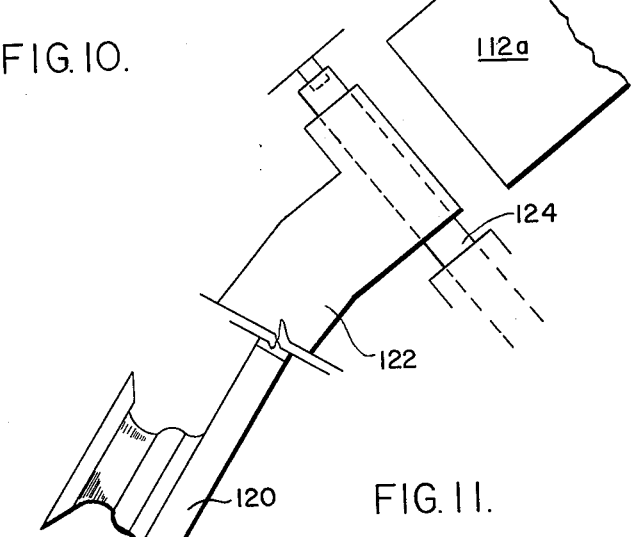
FIG. 11.
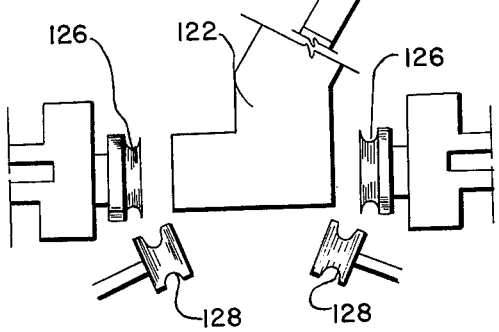
INVENTOR.
Leonard L. Leinonen
BY Brown and Mikulka
and
Stanley H. Mervis
ATTORNEYS 3,234,024
PHOTOGRAPHIC FILM ROLL AND METHODS AND APPARATUS FOR MANUFACTURING SAME
Leonard L. Leinonen, Framingham, Mass., assignor to Polaroid Corporation, Cambridge, Mass., a corporation of Delaware
Filed Jan. 25, 1963, Ser. No. 253,830
21 Claims. (Cl. 96—78)

This invention is concerned with photography and, more particularly, with novel photosensitive products and methods and apparatus for manufacturing said products.

It is common practice to form photosensitive film rolls by winding a length of photosensitive film around a spool of the proper dimensions, a flange at each of the spool providing a means of shielding the film from edge exposure to light prior to photoexposure, the outer layer or layers of the resulting roll providing a lightshield for the photosensitive material and preferably comprising an opaque, non-photosensitive leader which facilitates loading and threading the film in the appropriate photographic apparatus. Where it is desired to employ such film rolls in self-developing cameras of the general type described and claimed in U.S. Patent No. 2,455,111 issued November 30, 1948 to Joseph F. Carbone, it is customary to associate the film roll with a roll of image-receiving material to provide a composite film product. Examples of such film rolls and composite film products may be found in a number of patents, e.g., U.S. Patent No. 2,579,587 issued December 25, 1951 to Edwin H. Land; U.S. Patent No. 2,630,385 issued March 3, 1953 to Otto E. Wolff; U.S. Patent No. 2,830,901 issued April 15, 1958 to Otto E. Wolff; and U.S. Patent No. 3,022,170 issued February 20, 1962 to R. F. Flinchbaugh et al. The general structure of suitable image-receiving elements also is well known; see, for example, U.S. Patent No. 2,612,452 issued September 30, 1952 to William J. McCune, Jr. The image-receiving element includes a plurality of positive frames or image-receiving areas adapted to be brought into registered superposed relationship with an exposed frame of the photosensitive film, suitable means being provided to interconnect the two rolls and to assure proper registered advancement thereof through the photographic apparatus. Each individual image-receiving area has associated with it a rupturable container releasably confining a processing composition, said container being ruptured by application of compressive force, as by being passed between a pair of pressure rolls, the container being so positioned that the released processing composition is applied to the exposed photosensitive frame and the superposed image-receiving area. Suitable means, e.g., a row of perforations of slits, usually are provided to facilitate separation of the finished positive image from the image-receiving element.

This invention is primarily concerned with an improvement in said film rolls and composite film products, wherein a novel film roll is provided in which the photosensitive material is not rolled around a core but is held within a container comprising a tube formed of a leader attached to said photosensitive material and suitable end caps covering and secured to the ends of said tube. A further object of this invention is to provide such novel film rolls wherein the photosensitive material comprises alternating photosensitive and non-photosensitive areas, thereby providing substantial economies in the use of the photosensitive material.

Still another object of this invention is to provide novel procedures and apparatus for forming the aforesaid novel film rolls. Additional objects of this invention include the provision of novel leaders for photosensitive material, and novel end caps for attachement to leader material to form novel film rolls.

Other objects of the invention will in part be obvious and will in part appear hereinafter.

The invention accordingly comprises the several steps and the relation and order of one or more of such steps with respect to each of the others, and the product possessing the features, properties and the relation of elements, which are exemplified in the following detailed disclosure, and the scope of the application of which will be indicated in the claims.

For a fuller understanding of the nature and objects of this invention, reference should be had to the following detailed description taken in connection with the accompanying drawings wherein:

FIGURE 1 is an end view of a composite film product containing a novel film roll of this invention;

FIG. 2 is a partial view in cross-section through the longitudinal center of a novel film roll of this invention;

FIG. 3 is a top view of a novel film roll of this invention showing the leader partially unwound;

FIG. 4 is a top view, partially cut away, of a leader for use in accordance with this invention and showing details of representative slit means for severing the leader from the film roll;

FIG. 5 is a back view, partially in section, of an end cap prior to attachment thereof to form the film roll shown in FIG. 2;

FIG. 6 is a top view of a partial length of an intermittent photosensitive film with a leader attached thereto, prior to formation therefrom of a novel film roll in accordance with the preferred embodiment of this invention;

FIG. 7 is a side view in cross-section of the intermittent film embodiment shown in FIG. 6;

FIG. 8 is a front view of another end cap used in the preferred embodiment of this invention;

FIG. 9 is a sectional view of the end cap shown in FIG. 8 and taken along the line 9—9;

FIG. 10 is a perspective view of apparatus for forming lengths of intermittent film in accordance with the preferred embodiment of this invention; and FIG. 11 is a view, partially cut away, of apparatus for forming the novel film rolls of this invention.

As previously noted, the general method of forming film rolls has been to wind a length of film onto the core of a film spool, opaque flanges attached to the ends of the core providing a means of shielding the edges of the film from light. The outer convolutions of the thus-formed film roll are generally comprised of an opaque paper leader, the end of which is secured to the roll by a piece of tape. Such film rolls, of necessity, are wound rather tightly upon the core, and the resulting inherent pressure may cause adverse effects upon the photosensitive emulsion, i.e., abrasion or pressure desensitization.

This invention is concerned with providing novel film rolls in which the film is not wound upon a central core but wherein the rolled up film is held relatively loosely within a tube formed of a leader, the ends of the tube being covered with suitable end caps. Because the photosensitive film contained within the tube is not wound upon a core but is present as a relatively loosely wound coil within a relatively rigid or stiff tube, the film is free to expand or contract with changes in storage conditions, e.g., temperature or humidity, thereby avoiding the previously noted adverse pressure effects.

The preferred embodiments of this invention are concerned with providing film rolls for use in self-developing cameras, e.g., in a camera of the type described in the aforementioned U.S. Patent No. 2,455,111. Such cameras utilize a composite film product, such as that shown in FIGURE 1, and comprising photosensitive film roll 10 associated with a roll 12 of an image-receiving element 14 releasably maintained in rolled-up form and carrying a plurality of substantially equally spaced, rupturable containers 16 releasably holding a predetermined quantity of processing composition. Composite film products of this type but employing conventional roll film spools are shown, for example, in the aforementioned U.S. Patents Nos. 2,579,587 and 3,022,170.

The novel film rolls of this invention comprise a tube formed of a plurality of convolutions of sheet-like material, at least portions of which carry a photosensitive stratum, the outer convolution or convolutions being adapted to serve, at least in part, as a leader in loading the film into a camera. This leader portion may be an extension of the photosensitive sheet-like material, but preferably comprises a length of opaque paper attached to one end of the photosensitive film. A length of such film is wound upon a mandrel to form a tube, and the ends of the thus-formed tube are closed by suitable end caps secured to the outer surface of the tube. A fragmentary portion of one such film roll is shown in cross-section in FIG. 2, wherein the end of a tube having inner convolutions of photosensitive film 24 and outer convolutions of a leader 26 is closed by an end cap 20 having a flange 22, the periphery of which has been rolled inwardly to secure the end cap 20 to the tube. It will be noted that the width of the negative is slightly less than the width of the leader portion, so that the edges of the rolled-up film 24 do not touch the inner face 27 of the end cap 20; the width of the leader need only be sufficiently greater than that of the film to permit attachment of the end caps in the indicated manner. Expressed in a different manner, the width of the photosensitive film 24 is slightly less than the distance between the adjacent inner faces 27 of the opposing end caps, so that the inner convolutions may turn free of the end caps. A back view of end cap 20 of FIG. 2 is shown in FIG. 5 prior to being attached to the film tube.

In order to facilitate the unwinding of the film roll, the leader portion 32 is provided with severing means, e.g., a series of perforations or slits 34, adjacent the edges thereof, as shown in FIG. 3 wherein is shown a partially unwound leader 26. The particular configuration of the slits or perforations provided to facilitate severing the leader from the end caps is not critical but is so selected as to give the requisite light shielding and ease of severing. Thus, the slits or perforations are so spaced that the slits in one convolution of leader will not overlap the slits in the overlying or underlying convolution of leader, thereby preventing light leakage through said slits with resultant fogging of the photosensitive material. In a typical embodiment, as shown in FIG. 4, the slits 34 are made at an angle "a" of approximately 20 degrees to a line parallel to the edge of the leader 26, the distance "b" between the beginning of repeat cuts is approximately 0.2 inch, and the width "c" of the slit is approximately 1/16 of an inch.

In a preferred embodiment, the ends of the film tube are approximately one inch in diameter after the end caps have been attached. The leader preferably is of sufficient length so that at least about two convolutions of leader remain after a sufficient length of leader has been unwound to permit loading the film in the camera. It will be recognized that the number of convolutions of leader material is determined by the light-shielding capacity of the leader material (and its perforation pattern) and the amount of light shielding required in the particular use of the film roll.

The novel film rolls of this invention have many advantages when employed with an essentially continuous length of photosensitive material as indicated above. Additional advantages arise from the use of an intermittent film, i.e., a film which has portions of photosensitive material alternating with portions of non-photosensitive material. The use of such an intermittent film permits the replacement of a substantial area of photosensitive material with appreciably less expensive non-photosensitive material, e.g., a paper base which is preferably waterproof and of approximately the same thickness as the photosensitive material and which preferably has substantially the same modulus of elasticity as the photosensitive material. It has been found that as much as 40% of the photosensitive material can be so replaced with non-photosensitive material without reducing the area of photosensitive material required for photoexposure. The photosensitive and non-photosensitive portions are joined together by suitable splices or lap joints formed by bonding together narrow overlapping edges; examples of such intermittent film are set forth in the previously mentioned U.S. Patent No. 2,830,901. In the preferred embodiment, the non-photosensitive or paper portions are provided with a heat-sensitive adhesive on the side contacting the photosensitive material, and bonding is effected by a brief application of heat to one or both sides of the joint formed by the overlapping sheets. A particularly useful heat-sensitive adhesive is polyethylene which is, e.g., effectively bonded at a temperature of about 300° F. with a dwell time of about 0.2 second or less; other adhesives also may be used. The adhesives preferably are waterproof, substantially inert to the photosensitive material and to the photographic reagents employed in processing, capable of forming a joint capable of withstanding the pull exerted upon the film when in use, and sufficiently stable to permit storage for an extended period.

Because the coiled-up photosensitive film is not wound upon a core but is held under minimum tension and is free to expand and contract within the film tube, simple overlap splices, such as the overlap splices 44 and 48 shown in FIGS. 6 and 7, may be used without causing pressure marks that would result if the same film were wound upon a conventional film spool.

In the preferred embodiment of this invention, the film is of the intermittent type as shown in FIGS. 6 and 7, wherein the desired number of photosensitive portions 40 are attached to non-photosensitive portions 42 by lap joints 44. A leader portion 32 having slits 34 is attached to one of the end non-photosensitive portions 42 by a lap joint 48. The end of the leader 32 is provided with tapered edges 50 so that a relatively short terminal portion of the leader will not lie under the end cap rim but will extend outwardly from the film tube or roll to facilitate winding of the film roll and/or attaching the leader to a leader portion secured to the image-receiving roll. In addition, the leader 32 may be provided with apertures, such as holes 52, which function as registration guides in attaching the film roll to the image-receiving roll. Also, the leader 32 may be imprinted with appropriate legends or indicia 46 to warn the user when the unwinding of the leader has reached a point where further unwinding in non-light-shielded areas may result in fogging of the photosensitive material. In a typical embodiment of the type shown in FIGURE 6, the leader 32 is approximately 13 15/16" long, 3 13/16" wide, the end is tapered to a width of approximately 3 19/32", the splices 44 are approximately 1/16" wide, and the photosensitive portions 40 and non-photosensitive portions 42 are approximately 3 5/8". Where the final film roll is approximately 7/8" in diameter, the warning indicia 46 is imprinted at a distance of about 8 to 8½" from the end of a 13 15/16" long leader.

A preferred configuration for the end caps is shown in FIGURES 8 and 9, wherein the end cap includes a centrally located, outwardly extending, axial protuberance or nubbin 80, a centrally located, inwardly extending hub 86, a shoulder portion 82 and a flange portion 84. The nubbin 80 may be omitted, if desired, but is desirable if the film rolls are intended for use in cameras which utilize a spring clip to releasably mount the film roll; note, in this connection, the adapter 38 and spring clip 38a of the camera shown in FIGURE 1 of the previously mentioned Carbone et al. U.S. Patent No. 2,455,111.

The inner hub 86 of the preferred end cap shown in FIGURES 8 and 9 need only be long enough to serve as an axle upon which the film roll may rotate after the leader has been severed from the end caps. Provision of such an axial hub avoids any possibility that the unwinding film may jam within the camera film well; this problem occurs occasionally if the wound-up film is relatively long and end caps which do not have such inner hubs, such as the end cap shown in FIGURE 5, are employed.

It will be noted that when the novel film rolls of this invention are placed in a camera film well, the end caps will be completely free of the convolutions of photosensitive film once the leader portion has been severed from the end caps. Because of the relative dimensions of the camera well, end caps and the film width, the end caps tend to remain upright with respect to the film roll even though unattached thereto, at least until the last film frame has been brought into the camera's focal plane for exposure.

In general, the film roll is formed by winding the film and attached leader upon a suitable mandrel to provide a tube, removing said tube from the mandrel and, without unwinding said tube, positioning a pair of end caps adjacent the ends of said tube with at least a portion of said end caps on the ends of said tube, placing a die of suitable shape in contact with the periphery of said end caps, and rotating the die and/or the tube in order to roll, spin, or crimp the peripheral edge portion of said end caps inwardly to secure the end caps to the outer surfaces of said tube. Thus, in the preferred embodiment, the end cap has a configuration similar to that shown in FIGS. 8 and 9, and is positioned so that the inner hub 86 fits within the film tube with the flange 84 gripping the end of the leader convolutions, the outer periphery of flange 84 being rolled over to engage the outer surface of the tube.

In FIG. 10, there is shown diagrammatically an apparatus for forming an intermittent film in accordance with the preferred embodiment of this invention, a length of which film then may be formed into a film roll employing an apparatus such as that shown in FIG. 11. Referring first to FIG. 10, there are shown a plurality of rolls 100 of non-photosensitive paper and a plurality of rolls 102 of photosensitive film which are unwound with the several strips in parallel relationship, adjacent edges being overlapped sufficiently to provide a joint or splice such as splice 44 shown in FIGS. 6 and 7. These strips are then passed under heat-sealing means 104 where heat is applied briefly to at least one side, and preferably to both sides, of the edge overlap, to form a web 105. This web 105 is advanced in stages towards a knife 110 by alternative application of a moving gripping means 106 and a stationary gripping means 108. In practice, the web 105 is advanced cyclically by engaging a moving gripping means 106 and disengaging stationary gripping means 108, moving the moving gripping means 106 to a position adjacent the disengaged stationary gripping means 108, disengaging the moving gripping means 106 and engaging the stationary gripping means 108 to hold the web 105 stationary while the moving gripping means 106 returns to its starting point and the cycle is repeated. Each cycle preferably advances the web 105 a distance substantially the same as the desired width of the ultimate single intermittent film strip 112, which intermittent film strips 112 are severed from the advancing web 105 by a knife 110. In a preferred embodiment, the web contains seven non-photosensitive or spacer portions, and six photosensitive portions each positioned between a pair of adjacent spacer portions. A leader 114 is supplied by a supply means (not shown) which may cut the leader to the desired configuration, punch appropriate registration apertures, print desired instructions thereon, etc. This leader 114 is then attached to one end of the intermittent film strip 112, e.g., by conventional heat-sealing means (not shown) to provide a film strip 112a ready for winding into the novel film roll.

Referring now to FIG. 11, there is shown an apparatus for forming film rolls, wherein a rotatable turret wheel 120 has mounted thereon at least one, and preferably at least two, captivator jaws 122. A film strip 112a is fed onto a mandrel 124 positioned with a captivator jaw 122, the jaw being closed down to the desired film tube diameter. As the film strip 112a is wound upon the mandrel 124, snugger rolls or wheels (not shown) ride against the winding film to hold it snugly on the mandrel, said snugger rolls being pushed away from the mandrel as the diameter of the film tube increases to form a tube slightly narrower in diameter than the aforementioned desired diameter. After the mandrel 124 is pulled out of the tube, the snugger rolls are pulled back allowing the film tube to expand by its own elasticity to the desired outside dimension of the paper tube, end guides (not shown) being used to prevent telescoping of the unwinding tube.

The captivator jaw 122 having the film tube of the desired diameter is rotated into alignment with a pair of chucks 126, preferably vacuum chucks, holding end caps. The chucks are advanced toward the film tube to bring the end caps into proper relationship, and one or more dies 128 of suitable configuration then are brought into contact with the end cap flanges and rotated rapidly to roll the periphery over to attach the end caps to the tube. (Techniques for attaching end caps to tubes, and suitable apparatus and dies therefor, are well known in the art and per se form no part of this invention.) In the preferred embodiment, an end cap having a configuration similar to that shown in FIGS. 8 and 9 is used, and the flange or shoulder 84 grips the roll and holds it steady while the end caps are spun on. If desired, air may be injected into the tube to make sure that there is adequate space to receive the inner hub 86 of the end cap.

After the end caps have been attached, the arms of captivator jaw 122 are opened to release the film roll, which may be dropped onto a conveyor (not shown) for carriage to another location, e.g., for assembly with an image-receiving roll.

The end caps generally may be drawn from thin metal, e.g., aluminum or tin plate. In a preferred embodiment, the end caps are drawn from an 0.012" thick piece of aluminum, and are approximately 0.010" thick after being drawn to the desired configuration. The end caps also may be formed of a photographically inert plastic which may be cold rolled to secure the flange to the tube. In still another embodiment, the inner hub and nubbin portions of the end caps may be made of plastic and held in place by an aluminum washer, the periphery of which is rolled over to grip the leader.

In the preferred embodiments of the apparatus shown in FIG. 10, only the spacer paper is driven, so that any possibility of scratching or damaging the photosensitive material is avoided. The spacer paper may be driven by pinch rolls or, more preferably, by spring loaded gripper pads positioned above or below the paper. The preferred method of advancing the severed film strips 112 and 112a is to employ vacuum transporting means. Unwinding and advancement of the photosensitive material is effected by being pulled as the web 105 of edge bonded strips is advanced.

Suitable temporary seals for maintaining the composite film product of FIGURE 1 are described and shown in the previously noted U.S. Patents Nos. 2,630,385 and 3,022,170.

It will be understood that all operations involving photosensitive material are performed in the absence of radiation actinic to the photosensitive material. At least the rolls 102 of photosensitive material should be kept in a light-proof housing to minimize loss due to light should it become necessary to turn the lights on, e.g., for servicing. Suitable controls for detecting the end of a supply roll of spacer paper or photosensitive material, or for detecting splices in such materials, or for detecting portions which should be rejected, etc., may be provided as desired.

The photosensitive portions may comprise any photosensitive material, e.g., silver halide, diazo, etc., coated upon the usual bases, such as paper or plastics like cellulose acetate, polyethylene terephthalate, polycarbonate, etc. The leader portion, and if desired the spacer portions also, may comprise opaque paper plastic. If desired, as for packaging for use in tropical areas, the outer convolutions of leader may be formed of a relatively vapor-impermeable material, such as paper/aluminum foil laminate. The novel film rolls of this invention may be used in the practice of diffusion transfer processes in which the transfer images are composed of dyes, silver, or other image-forming substances, and which images may be either monochromatic or multicolor.

The specific nature and construction of the image-receiving element, the processing composition and rupturable containers therefor, and which may be used with the novel film rolls of this invention, form no part of the present invention per se and are adequately described in the art, as evidenced by the previously mentioned U.S. patents and also U.S. Patents Nos. 2,543,181, issued February 27, 1951, and 2,647,056, issued July 28, 1953, both in the name of Edwin H. Land, as well as many other issued patents in the United States and other countries.

While this invention has been described with particular attention to use in self-developing cameras, it will be understood that film rolls embodying the inventive concepts herein set forth may also be used in many other photographic cameras and processes. As previously noted, the novel film rolls of this invention do not contain a core upon which the film is wound. Because of this feature, one cannot rewind the exposed film in the conventional manner. Where it is desired to utilize this new film roll in conventional cameras, one may provide a suitable film spool or cassette for receiving the exposed film and upon which the exposed film may be wound, thereby permitting light-tight removal of the exposed film from a camera for processing.

Since certain changes may be made in the above products, processes and apparatus without departing from the scope of the invention herein involved, it is intended that all matter contained in the above description or shown in the accompanying drawings shall be interpreted as illustrative and not in a limiting sense.

What is claimed is:

1. The method of forming a roll of photosensitive film which comprises the steps of winding a length of photosensitive film to form a tube, said length of film having a leader portion attached to one end thereof and said leader providing at least the outer convolution of said tube, said leader being slightly wider than said film, and covering each end of said tube with an end cap, said end caps being attached only to said leader, said leader including severing means positioned adjacent the edges whereby said leader may be readily severed from said end caps.

2. The method as defined in claim 1, including the steps of winding said film upon a mandrel to form a tube, removing the thus-formed tube from said mandrel, and at least partially relaxing the tension on said tube prior to attaching said end caps.

3. The method as defined in claim 1, wherein said end caps are metallic and metallic caps are attached to said tube by rolling the outer periphery of a flange on each said cap.

4. The method as defined in claim 3, wherein said caps are aluminum.

5. The method as defined in claim 1, including the steps of positioning in substantially parallel relationship a plurality of lengths of sheet-like materials, alternate lengths of said sheet-like materials carrying at least one photosensitive stratum, the remaining lengths of sheet-like materials being non-photosensitive, overlapping edge portions of said alternating lengths of sheet-like materials, bonding said overlapping edges to form a web of alternating photosensitive and non-photosensitive areas, and cutting said web transversely to form each said length of photosensitive film.

6. The method as defined in claim 5, wherein said bonding is effected by application of heat to at least one surface of said overlapping edges, said non-photosensitive material carrying a heat-sealing adhesive.

7. A photographic film roll comprising a tube composed of a plurality of convolutions of sheet-like material, at least a portion of the inner convolutions of sheet-like material carrying a photosensitive stratum, at least the outer convolution of sheet-like material being a leader portion for facilitating the positioning of said film in a photographic apparatus, the ends of said tube being closed by end caps attached to the outer convolution of said tube, said leader portion including severing means adjacent the edges whereby said leader may be readily severed from said end caps.

8. A photographic film roll as defined in claim 7, wherein said severing means comprise perforations.

9. A photographic film roll as defined in claim 7, wherein said severing means comprise slits.

10. A photographic film roll as defined in claim 7, wherein said leader portion is slightly wider than said inner convolutions of photosensitive material, said inner convolutions of photosensitive material being loosely coiled within said leader and attached only to said leader.

11. A photographic film roll as defined in claim 10, wherein said inner convolutions of photosensitive material are composed of alternating photosensitive and non-photosensitive areas.

12. A photographic film roll as defined in claim 11, wherein said alternating photosensitive and non-photosensitive areas are connected by overlap splices.

13. A photographic film roll as defined in claim 7, wherein said photosensitive stratum comprises silver halide.

14. A photographic film roll as defined in claim 7, wherein each said end cap includes a centrally located, inwardly extending hub, at least part of said hub being positioned within the innermost of said convolutions, the inner diameter of said tube being larger than the diameter of said hub.

15. A photographic film roll as defined in claim 14, wherein each said end cap also includes a centrally located, outwardly extending nubbin.

16. A photographic film roll as defined in claim 7, wherein the end of said leader portion is tapered whereby it is free of said end caps.

17. A composite photographic product comprising, in combination, a film roll as defined in claim 7; a second roll comprising an image-receiving element releasably maintained in rolled-up condition; said image-receiving element comprising an image-carrying layer, a plurality of rupturable containers spaced equal distances from each other and sequentially arranged on a surface of said image-carrying layer, each of said containers releasably holding a predetermined quantity of processing composition and being secured transversely to said image-carrying layer, each said container being capable of releasing its contained processing composition for spreading across a predetermined area of said image-carrying layer; and means securing together said leader portion of said film roll and a leader portion of said image-receiving element so that an exposed area of said photosensitive material may be brought into superposed, registered relationship with a predetermined area of said image-receiving element with said processing composition released therebetween.

18. Apparatus for forming photographic film rolls comprising, in combination:
(a) means for supplying a plurality of spaced apart strips of a non-photosensitive sheet-like material;
(b) means for supplying a strip of a photosensitive sheet-like material between each pair of said spaced-apart strips of non-photosensitive material;

(c) means for positioning and advancing adjacent strips of non-photosensitive and photosensitive material in parallel relationship with edge portions thereof in overlapping relationship;
(d) means for bonding together said overlapping edge portions to form a web;
(e) means for transversely severing said web to provide a length of film having alternating non-photosensitive and photosensitive areas;
(f) wind-up means for winding said length of film into a tube;
(g) means for removing said tube from said wind-up means and to allow said tube to expand in diameter before said end caps are attached; and
(h) means for attaching a cap to each end of said tube.

19. Apparatus as defined in claim 18, wherein said means for bonding overlapping edge portions comprise means for applying heat to at least one outer surface of each said overlap.

20. Apparatus as defined in claim 18, including means for supplying a leader portion to one end of said length of film, and heat sealing means for attaching said leader portion to said end.

21. Apparatus as defined in claim 18, wherein said means for attaching said end caps comprises a die adapted to roll the outer periphery of a flange on said cap inwardly into contact with the outer convolution of said tube.

References Cited by the Examiner
UNITED STATES PATENTS

| | | | |
|---|---|---|---|
| 916,325 | 3/1909 | Kelly | 96—78 |
| 1,469,017 | 9/1923 | Kingsbury | 96—78 |
| 1,809,267 | 6/1931 | Cushing | 242—68.6 |
| 2,176,507 | 10/1939 | Nagel | 96—78 |
| 2,575,025 | 11/1951 | Mihalyi | 96—78 |
| 2,579,587 | 12/1951 | Land | 96—78 |
| 2,830,901 | 4/1958 | Wolff | 96—76 |
| 2,939,645 | 6/1960 | Rowlands et al. | 242—78.2 |
| 3,022,170 | 2/1962 | Flinchbaugh et al. | 96—78 |
| 3,086,862 | 4/1963 | Eagle et al. | 96—78 |

References Cited by the Applicant
UNITED STATES PATENTS

| | | |
|---|---|---|
| 2,695,847 | 11/1954 | Fisher. |
| 2,793,126 | 5/1957 | Fienup et al. |
| 2,814,428 | 11/1957 | Mangill. |
| 3,009,626 | 11/1961 | Johnson. |

NORMAN G. TORCHIN, *Primary Examiner.*